UNITED STATES PATENT OFFICE.

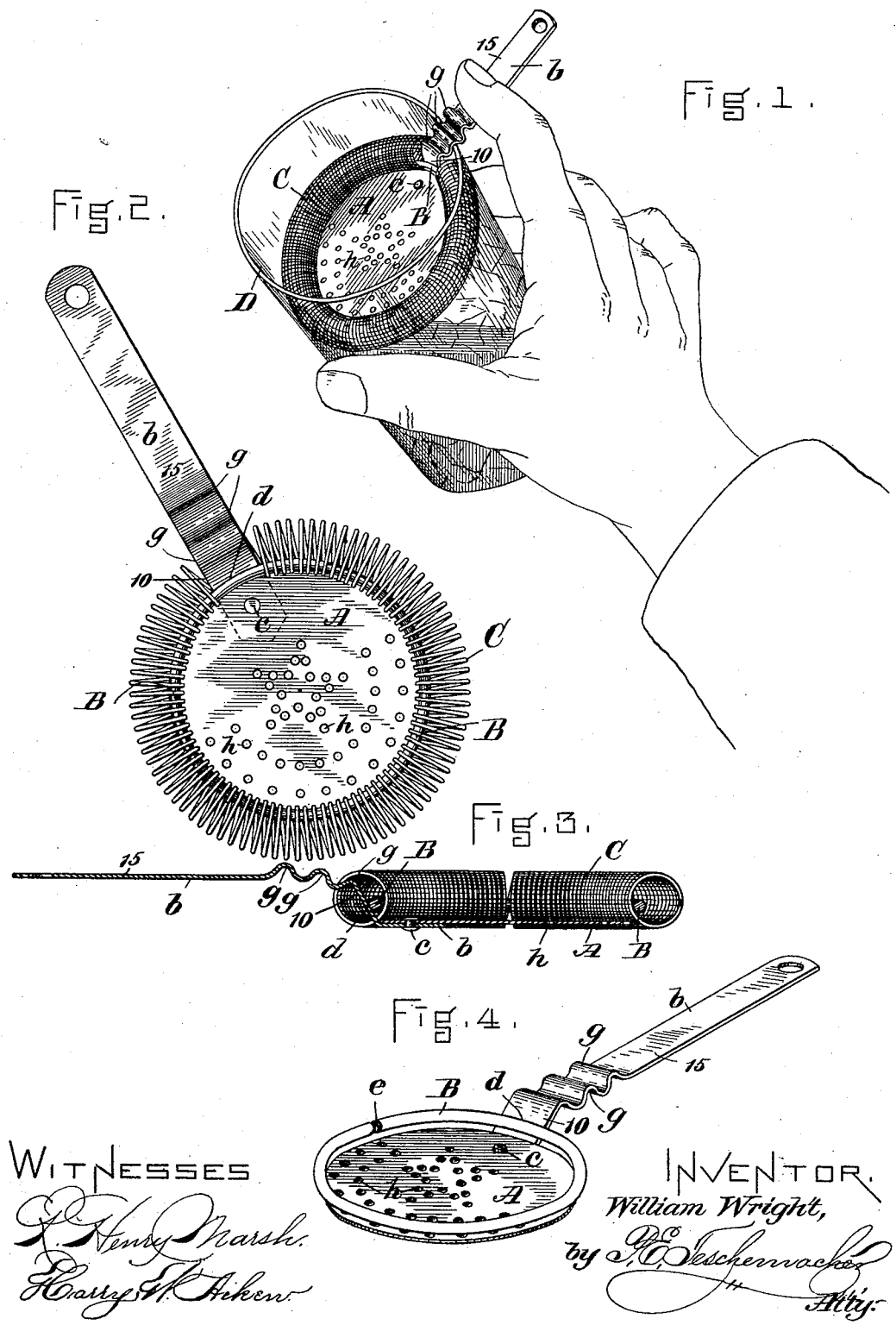

WILLIAM WRIGHT, OF BOSTON, MASSACHUSETTS, ASSIGNOR TO DENNIS P. SULLIVAN, OF SAME PLACE.

STRAINER FOR MIXED DRINKS.

SPECIFICATION forming part of Letters Patent No. 484,276, dated October 11, 1892.

Application filed July 19, 1892. Serial No. 440,512. (No model.)

*To all whom it may concern:*

Be it known that I, WILLIAM WRIGHT, a citizen of the United States, residing at Boston, in the county of Suffolk and State of Massachusetts, have invented certain Improvements in Strainers for Mixed Drinks, of which the following is a full, clear, and exact description, reference being had to the accompanying drawings, making part of this specification, in which—

Figure 1 is a perspective view of my improved strainer placed within a mixing-glass and illustrating the manner in which it is used. Fig. 2 is a plan view of my improved strainer. Fig. 3 is a longitudinal section of the same. Fig. 4 is a perspective view of the bottom plate of the strainer with its handle and coil-supporting ring, the wire coil being removed.

My invention relates to strainers which are adapted for use in making mixed drinks, such as cocktails, punches, &c., and particularly to strainers of this description consisting of a circular plate having a coil of wire around its outer edge, whereby the strainer is adapted to adjust itself to glasses of various sizes and shapes without regard to the angle at which it is placed within the glass.

To improve the construction of strainers of this description, so that the wire coil which extends around the plate will not only act to better advantage, but can be easily removed and replaced to facilitate the operation of cleansing the strainer, and also to enable the strainer to perfectly fit different-sized glasses and be held steadily within the glass at the desired inclination without liability of slipping is the object of my invention, which consists in the combination, with the circular plate which forms the bottom of the strainer and is provided with a handle, of a wire ring extending around said plate at a short distance from its outer edge and forming an independent support for said wire coil, which extends around the outer edge of the plate without being connected therewith, said wire ring being divided or disconnected at its ends to form a space or opening through which the self-adjusting wire coil can be placed upon it and readily removed therefrom to facilitate the operation of cleansing the same, as hereinafter more particularly set forth; and my invention also consists in providing the handle of the strainer near its inner end with a series of transverse corrugations adapted to fit the upper edges or rims of glasses of different diameters, whereby the strainer can be held steadily within the glass at the proper inclination without liability of slipping out of place.

In the said drawings, A represents a circular metallic plate, which forms the bottom of the strainer, said plate being provided with a handle $b$, secured thereto at $c$ and having its inner portion 10 bent upwardly at an angle, as shown in Fig. 3, to enable the strainer to properly fit within the glass, the straight portion 15 of the handle lying in a plane above that of the plate A.

B is a wire ring, which is soldered or otherwise secured to the handle $b$ at $d$ and extends around the plate A a short distance above its edge, as shown in Figs. 3 and 4. The ends of the ring B are not secured together, a space $e$ being thus left between the same for the admission of a light elastic wire coil C, which when slipped upon said ring B extends around the outer edge or periphery of the plate A, its ends bearing against the opposite sides of the handle $b$, as shown, said coil being supported and held in place by the ring B, which lies within it and permits it to readily yield inward and adjust itself to the style and size of the mixing-glass D within which it is placed, as shown in Fig. 1. When the strainer is pressed down into the glass D onto the ice, pieces of fruit, &c., and held at the desired inclination, the elasticity of the wire coil C causes it to yield inward and assume the exact shape necessary to fit closely against the inside of the glass around its entire circumference, with the exception of the space filled by the handle $b$, thus effectually retaining the particles of ice and other solid matter under the strainer, while the liquid passes freely through the coil C when the mixing-glass is tilted to pour said liquid into the drinking-glass. When it is desired to remove the wire coil C for the purpose of cleansing it, it is merely necessary to push one end back on the supporting-ring B as far as the space or opening $e$ and then slightly raise one end of the ring, when the coil C can be readily drawn off therefrom, leaving the parts as shown in Fig. 4, when they can be readily cleansed, after which the coil C is again slipped onto the ring B through the opening $e$. By thus mounting the wire coil C upon an independent supporting-ring having a division or opening between its ends instead of permanently securing the coil to the bottom plate of the strainer by threading the wire of the coil through holes at the edge of the plate, as heretofore, many important advantages are gained, as the wire coil when supported upon a ring, as shown, will yield inward without rolling upward and fit the interior of the glass more perfectly without leaving any open spaces for the passage of particles of ice or other solid matter which it is desired to keep back, while the ease with which the wire coil can be readily detached or removed greatly facilitates the operation of cleansing the strainer.

The inner portion of the handle $b$ is provided with a series of transverse corrugations $g$, adapted to fit over the edge of the mixing-glass, as shown in Fig. 1, whereby the strainer may be held within the glass at the proper inclination without liability of slipping out of place, the different corrugations enabling the strainer to properly fit glasses of various sizes and shapes.

The plate A is preferably provided with perforations $h$, as shown; but these perforations may be dispensed with, if desired, as the liquid in the glass will pass freely through the wire coil C.

I am aware that a strainer having a self-adjusting wire coil around the edge is not broadly new, and I do not, therefore, claim such as my invention. My strainer, however, differs from those hitherto constructed in having the wire coil mounted upon and supported by an independent wire ring instead of being threaded through holes at the edge of the bottom plate of the strainer, and also in being provided with means whereby the wire coil can be readily slipped off from its supporting-ring when it is desired to cleanse the strainer, these and the corrugations in the handle being the novel and essential features of my invention.

What I claim as my invention, and desire to secure by Letters Patent, is—

1. In a strainer, the combination, with the bottom plate and its handle, of a wire ring extending around said plate a short distance from its outer edge and a coil of wire placed upon and supported by said ring and extending around the edge of said plate without being connected therewith, said wire ring being divided or disconnected at its ends to leave a space or opening through which said wire coil may be placed upon said ring and readily removed therefrom, substantially as and for the purpose set forth.

2. In a strainer, the combination of the bottom plate A, provided with a handle $b$, having transverse corrugations $g$ at its inner end, a divided wire ring B, secured to said handle and extending around the plate A at a short distance from its outer edge, and the wire coil C, mounted upon and supported by said ring B and extending around the edge of the plate A without being connected therewith, said wire coil C being made removable from the ring B through the space or opening between the separated ends of said ring, all constructed and arranged to operate substantially as set forth.

Witness my hand this 15th day of July, A. D. 1892.

WILLIAM WRIGHT.

In presence of—
P. E. TESCHEMACHER,
HARRY W. AIKEN.